Jan. 6, 1959    A. I. APPLETON    2,867,143
TOOL FOR SEAMLESS CONDUIT TERMINAL ELEMENTS
Filed Sept. 10, 1954    3 Sheets-Sheet 3

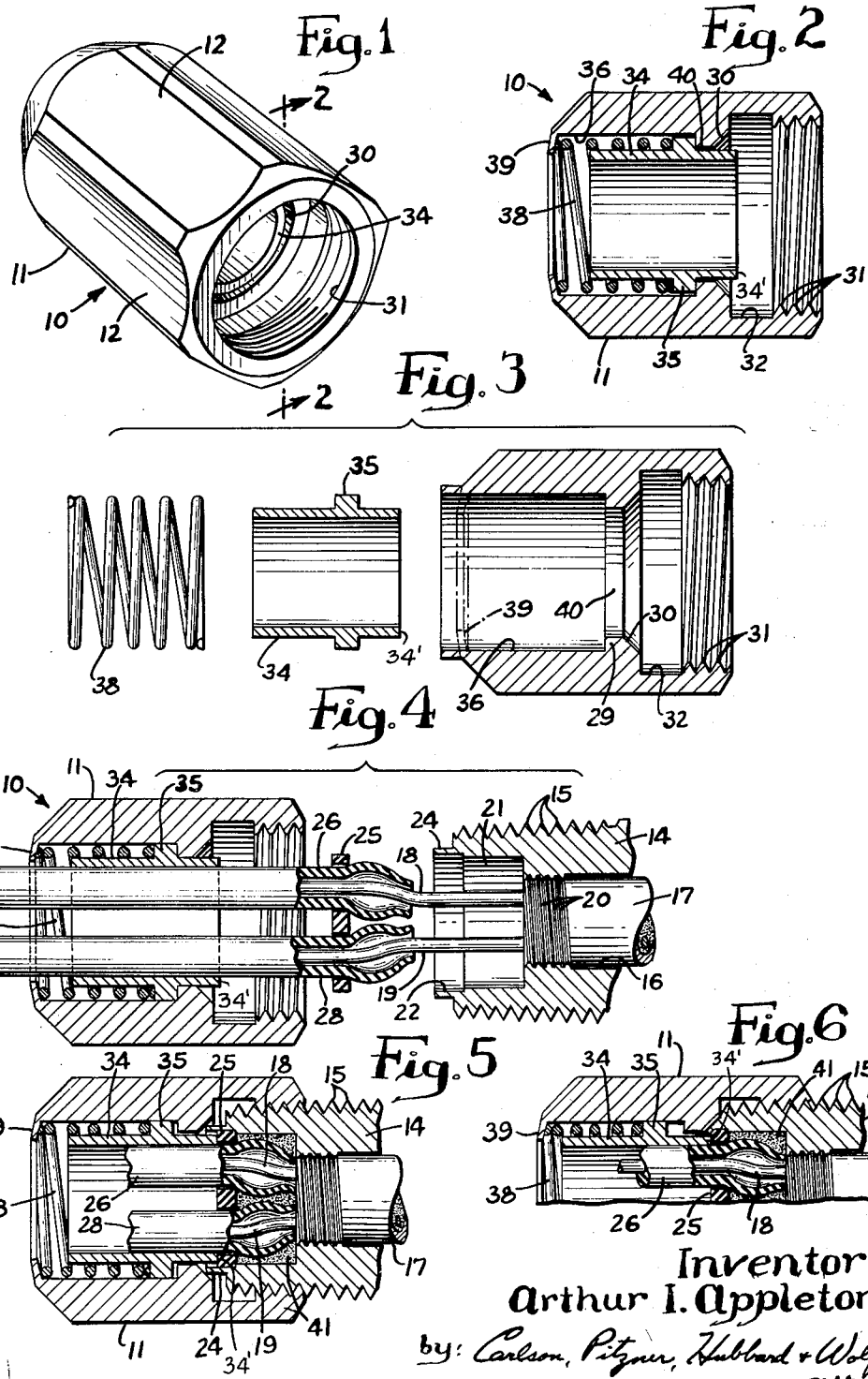

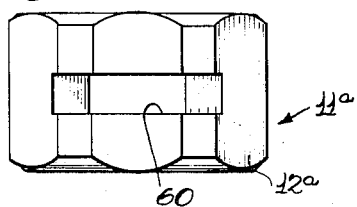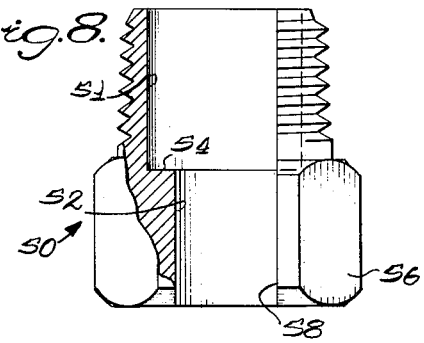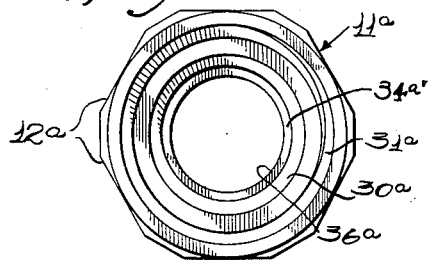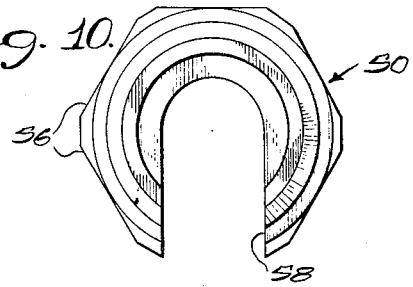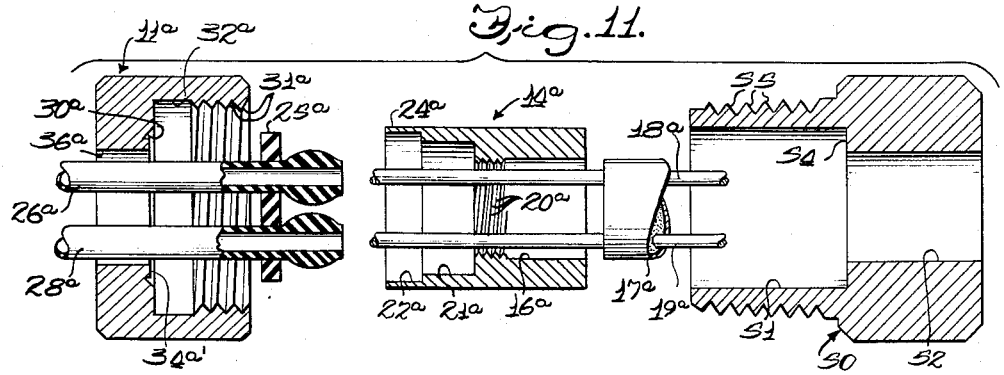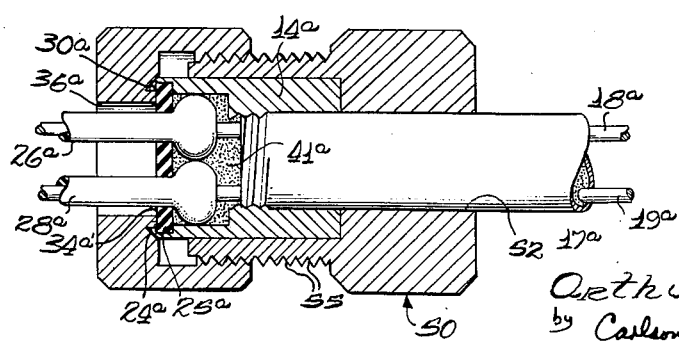

Inventor
Arthur I Appleton
by Carlson, Pitzner, Hubbard & Wolfe
Atty's

United States Patent Office 2,867,143
Patented Jan. 6, 1959

2,867,143

TOOL FOR SEAMLESS CONDUIT TERMINAL ELEMENTS

Arthur I. Appleton, Northbrook, Ill.

Application September 10, 1954, Serial No. 455,331

11 Claims. (Cl. 81—15)

The present invention pertains to the general field of portable tools. More specifically, the invention is concerned with a novel crimping tool finding particular, but by no means exclusive, utility in the installation of terminal insulated sheathed cable. This application is a continuation-in-part of application Serial No. 394,651, filed November 27, 1953, and now abandoned.

The expression "mineral insulated sheathed cable," as used herein, connotes a type of electrical cable or conduit comprising a seamless tubular metallic sheath which houses one or more conductors, the latter being maintained in spaced relation to each other and to the sheath by an inert mineral substance such as powdered magnesium oxide. Since this type of cable possesses many advantageous qualities, including resistance to moisture and fluids, it is preferable to install fluid-tight terminal elements at its ends.

Certain exemplary forms of such terminal elements are disclosed in my copending application Serial No. 446,475 filed July 29, 1954. While the specific structure of such elements or fittings may vary, each includes a sealing well for containing a quantity of sealing compound or a sealing member. The sealing well is closed by a cap of insulating material which anchors one or more insulator sleeves for the conductors of the cable. The sealing well cap is normally held in place by a deformable retainer skirt which surrounds the sealing well. A general aim of the tool disclosed herein is to effect positive location or seating of the cap and controlled deformation of such retainer skirt to lock the cap in place over the sealing well.

More particularly, it is an object of the invention to provide a portable tool for crimping a deformable retainer skirt to anchor the sealing well cap in place on a terminal element or fitting for mineral insulated sheathed cable, such tool being capable of speedy operation by even unskilled personnel.

Another object is to provide a tool of the character set forth above which will be of simple, compact, inexpensive construction, taking full advantage of the mounting structure of the fitting to facilitate operation by means of an ordinary hand wrench.

A further object of the invention is to provide such a crimping tool readily employed to sealingly deform a conduit terminal element which need not have external threads.

Other objects and advantages of the invention will become apparent from the following detailed description taken in connection with the accompanying drawing, wherein:

Figure 1 is a perspective view of one form of tool for illustratively embodying the present invention.

Fig. 2 is a longitudinal sectional view through the tool of Fig. 1 and taken in the plane of the line 2—2.

Fig. 3 is a view similar to Fig. 2 but showing the parts in exploded position to bring out structural details.

Figs. 4, 5 and 6 are sequential views detailing the manner in which the tool of Fig. 1 may be used in installing a fitting.

Figs. 7 and 8 are side elevations of a crimping member and a reaction member, respectively, employed in a second form of the present invention.

Figs. 9 and 10 are end views, taken toward the threaded ends, of the crimping and reaction members shown in Figs. 7 and 8, respectively.

Fig. 11 is an exploded sectional view showing an electrical conduit, a sealing head and the second form of the present tool prior to their cooperative engagement.

Fig. 12 is a sectional view illustrating the second form of tool as it is operating to crimp the skirt of the sealing head.

Figure 13:
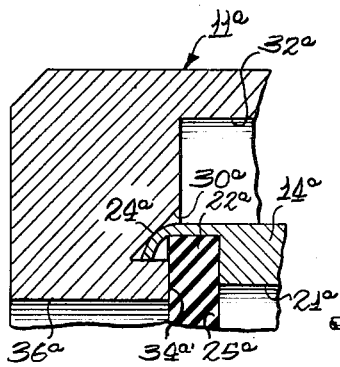
Fig. 13 is an enlarged, fragmentary view detailing a part of Fig. 12 and illustrating the coaction of the crimping member, a sealing well cap, and the retaining skirt.

While the invention is susceptible of various modifications and alternative constructions, certain illustrative embodiments have been shown in the drawing and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more specifically to Figs. 1–6, the invention is there exemplified in an illustrative crimping tool 10. The tool 10 comprises a main body which, for convenience of description, will be referred to as a barrel 11. The latter is provided externally with tool engaging means such as wrench flats 12 and in outward appearance resembles a relatively long nut.

Prior to discussing the internal construction of the tool 10, it will be helpful to consider briefly the relevant structural features of the conduit terminal elements with which the tool may be used. An illustrative one of such terminal elements is shown in part in Figs. 4, 5 and 6. In the present instance, the terminal element is shown as a fitting which includes a hollow body 14 having a plurality of mounting threads 15, receivable in the threaded opening of a junction box, on its outer peripheral surface. The body 14 has a cable-receiving passage 16 for receiving the end of sheath 17 of a section of mineral insulated sheathed cable, the last few inches of the sheath 17 having been stripped away so as to expose conductors 18 and 19. The sheath 17 may be anchored within the cable-receiving passage 16 by means such as self-cutting threads 20. Situated within the fitting body 14 and communicating with the cable-receiving passage 16 is a sealing well 21 which is adapted to receive a quantity of sealing compound in the form of an insulating paste. The outer end of the sealing well 21 is formed with a recess 22 and a surrounding retainer skirt 24. The recess 22 is adapted to receive the sealing well cap 25 and the retainer skirt 24 is so proportioned that it may be rolled over or otherwise deformed in a radially inward direction so as to hold the cap 25 firmly seated in the recess 22. The cap 25, which is normally of insulating material, is arranged to anchor protective insulator sleeves 26, 28 for the exposed cable conductors 18, 19, the sleeves 26, 28 having enlarged bulbous ends which project into the sealing well 21 when the fitting is assembled as shown in Figs. 5 and 6.

Turning now to the tool 10 in greater detail, it will be noted that the barrel 11 is bored longitudinally from one end to the other but with various diameters and configurations. Situated inside the barrel and intermediate the ends thereof is an annular wall 29. The latter is formed with a tapered or substantially frusto-conical squeezing shoulder 30 which increases in diameter toward the fitting-engaging end of the barrel. The shoulder is so proportioned that it will accost the retainer skirt 24 and deform the same radially inward when drawn axially toward the fitting body 14.

In order to positively draw the barrel 11 axially over the skirt 24 and thus effect the squeezing action just mentioned, provision is made in the illustrative tool 10 for taking advantage of the mounting threads 15 on the fitting body. Accordingly, the barrel 11 is formed adjacent its fitting-engaging end with internal threads 31 of appropriate size and pitch to engage the fitting body threads 15. To permit full engagement between the shoulder 30 and the retainer skirt 24, and also to facilitate manufacture of the barrel, a clearance recess 32 is located between the threads 31 and the annular wall 29.

For the purpose of holding the sealing well cap 25 firmly bottomed in the recess 22 during crimping of the retainer skirt 24 by the tool 10, the barrel 11 is equipped with a resilient holding means in the form of a plunger 34. As shown particularly in Fig. 3, the plunger 34 in this instance happens to be of hollow cylindrical construction and has on its outer periphery a stop shoulder 35 which may be of annular form. A radial face 34' on the end of the plunger 34 is located concentrically within the squeezing shoulder 30. The radially innermost margin of the shoulder 30 is spaced axially away from the fitting-engaging end of the tool with reference to the normal axial location of the face 34' (Fig. 4). The plunger 34 is slidably housed within a plunger recess 36 in the barrel 11 and is biased toward the fitting-engaging end of the barrel by a loading spring 38. When the tool is assembled, the spring 38 bears against an inturned annular flange 39 at the end of the barrel remote from the threads 31, and the adjacent face of the stop shoulder 35. The parts are so proportioned that when the stop shoulder 35 seats against the annular wall 29, the plunger projects through a circular plunger guide 40 formed in the wall 29 and extends somewhat beyond the squeezing shoulder 30 and toward the fitting-engaging end of the tool.

Although it is quite possible that the normal mode of use of the tool 10 will be already apparent to those skilled in the art, it will nevertheless be helpful to outline sequentially the principal steps in using the tool. Starting with the tool 10 and the fitting in the condition indicated in Fig. 4, the first step is to fill the sealing well 21 with sealing compound 41. Next, the sealing well cap 25 and protective sleeves 26, 28 are slid along the exposed conductors toward the fitting body until the cap 25 seats firmly in the recess 22 at the mouth of the sealing well. At this point, the tool 10 is slipped over the conductors 18, 19 and their sleeves 26, 28; brought into threaded engagement with the mounting threads 15 on the fitting body; and turned by hand until the end radial face 34' of the plunger 34 accosts the outer face of the sealing well cap and the squeezing shoulder 30 accosts the free end of the retainer skirt 24. During the course of such action, the plunger 34 may be displaced axially a slight distance in opposition to the thrust of its loading spring 38 but the face 34' firmly urges the cap 25 into the recess 22 so that the sealing compound is pressed into every part of the well and so that the skirt will not crush the edges of the cap. Abutment of the squeezing shoulder 30 against the end of the retainer skirt 24, as shown in Fig. 5, results in a sharp increase in resistance to turning of the tool 10 relative to the fitting body 14. At this point, a hand wrench is utilized to turn the tool 10, thereby drawing the squeezing shoulder hard against the retainer skirt 24 and exerting a radially inward squeeze on said shoulder. The skirt deforms approximately to the extent indicated in Fig. 6, whereupon the resistance to further turning of the tool 10 rises perceptibly, indicating that crimping of the retainer skirt 24 has been completed.

The tool 10 has been illustrated as applied to installation of a fitting having the sealing well integral with the fitting body. It will be appreciated, however, that the tool may be applied with equal facility to fittings where the sealing well is formed separately from the fitting body. By the same token, it will also be appreciated that the tool 10 with little or no modification, is susceptible of performing crimping operations on a wide variety of devices in addition to the particular types of fittings mentioned earlier herein.

Turning next to Figs. 7 through 13, a second embodiment of the present tool is there illustrated, parts generally similar to those shown in Figs. 1–6 being designated by like reference numerals to which the suffix "a" has been added. In this second form, the tool is intended to crimp, with an accurately controlled action, the cap-retaining skirt 24a of a conduit terminal element or sealing head 14a which is not externally threaded but rather which is relatively smooth on its outer surface. In certain types of electrical installations, such as industrial control panels, no threaded fitting body or connector is required. Rather, the mineral insulated sheathed cable is merely clamped near its end, the sheath sealed by the head 14a, and the individual conductors 18a, 19a connected to the electrical apparatus, for example, a contactor.

The sealing head or "pot" 14a shown for purposes of illustration in Figs. 11 and 12 is generally similar to the fitting body 14 shown in Figs. 4, 5 and 6 in that the former is somewhat larger in diameter than the conduit sheath 17a and is adapted, as by self-cutting threads 20a, to be rigidly fixed on the end of the conduit sheath. The head 14a is also formed with a relatively small diameter cable receiving passage 16a opening into a sealing well 21a which is bordered by the deformable cap-retaining skirt 24a and a recess 22a for receiving a cap 25a which retains sealing compound 41a (Fig. 12).

With the sealing head 14a fixed on the end of the conduit sheath 17a, there would normally be no means for axially forcing a crimping member or barrel against the skirt 24a. In accordance with another aspect of the invention, this difficulty is overcome by the provision of a reaction member 50 which is adapted to be removably slipped over the sheath 17a after the fitting body 14a is fixed to the latter. The reaction member 50 is further adapted to then be shifted axially into telescoping relation with the head 14a and is provided with means for engaging the conduit end (i. e., the end receiving the conduit) of the head so that such telescoping action is limited. Still further, the reaction member 50 is so formed as to receive a crimping member or barrel 11a in a manner such that the two can be drawn axially together, thus, squeezing the head 14a between them and causing the desired inward deformation of the skirt 24a.

As here shown, the reaction member 50 is sleeve-like in form, having a longitudinal passageway therein which includes a relatively large diameter portion 51 and a relatively small diameter portion 52. The internal diameters of the portions 51 and 52 are preferably only slightly greater than the diameters of the head 14a and the conduit sheath 17a. The large and small diameter portions are separated by an inernal radial shoulder 54 which is adapted to abut the conduit end of the head 14a as that part of the reaction member which defines the larger diameter portion 51 is telescoped over the head. For cooperating with the crimping member or barrel 11a, that portion of the reaction member which telescopes over the body 14a has external threads, as at 55. And for receiving a suitable wrench, the remaining external surface of the reaction member 50 is provided with wrench flats 56.

Since the reaction member is intended to be only temporarily employed after the head 14a has been fixed to the conduit sheath 17a, it is provided with a longitudinal slot 58 which is slightly greater in width than the diameter of the sheath 17a. Thus, the reaction member may be slipped over the conduit sheath and then slid toward the head 14a until the latter is telescoped into the larger diameter passage portion 51 and abuts against the internal shoulder 54. Removal of the reaction member 50 may be accomplished by performing the steps in reverse sequence.

The crimping member or barrel 11a is in this instance also sleeve-like in form, being provided with a longitudinal passage which includes the relatively large diameter portion 32a internally threaded as at 31a to cooperatively engage the threads 55 on the reaction member 50. The longitudinal passage through the barrel 11a further includes a small diameter portion 36a through which the conductors 18a, 19a and the insulating sleeves 26a, 28a may be passed. Separating the large and small diameter passage portions 32a and 36a is a radial face 34a', in this instance formed integrally with the barrel. The face 34a' is slightly smaller in diameter than the deformable skirt 24a on the fitting body and is adapted to abut the sealing cap 25a to firmly seat the latter in the recess 22a as the parts are brought into engagement. Concentrically surrounding the radial face 34a', there is a tapered squeezing shoulder 30a which is adapted to deform the sealing skirt 24a as explained previously in connection with Figs. 1-6. It will be noted that the shoulder 30a has its radially innermost margin disposed axially spaced, in a direction away from the head-engaging end of the barrel, from the cap-engaging face 34a'. The shoulder 30a flares radially outward in an axial direction toward the fitting-engaging end of the barrel 11a.

It is possible that an excess amount of the sealing compound 41a might sometimes be placed in the sealing well 21a. To permit escape of the excess compound squeezed out of the well as the cap is snugly seated, the crimping member 11a is ported or vented on its sides. In the present case, one or more circumferentially disposed ports 60 (Fig. 7) are cut in the body of the barrel 11a. These communicate from within the passageway portion 32a to the external surface of the barrel, which as shown, may be formed with wrench flats 12a. Thus, when the parts are brought together and the cap 25a firmly seated in the recess 22a, any excessive sealing compound squeezed out of the well 21a may escape from within the barrel 11a through the slots 60.

This second form of the present tool is utilized in substantially the same manner as that previously described, except that the reaction member 50 provides means for drawing the barrell 11a axially over the fitting body. The steps in the use of the tool may be briefly set forth in order to provide a clearer understanding of its advantages. First, the sealing well 20a is filled with the sealing compound 41a, after the fitting body 14a has been fixed on the end of the conduit sheath 17a. The insulating sleeves 26a are slipped into the sealing well and the sealing cap 25a roughly positioned in its recess 22a. Next, the reaction member is placed over the conduit sheath 17a, by inserting the latter through the slot 58; and then the reaction member is moved axially along the conduit until the sealing head 14a telescopes into the larger diameter passage 51 and abuts the internal shoulder 54. The crimping barrel 11a is next slipped over the insulated conductors 18a, 19a, and threads 31a brought into engagement with the cooperating threads 55 on the reaction member.

Tightening of the reaction member 50 and crimping barrel 11a into threaded engagement then advances the radial face 34a' so that it firmly seats the cap 25a in the recess 22a. As the threading movement progresses, the tapered shoulder 30a is brought into engagement with the retaining skirt 24a so that the latter is deformed radially inward to lock the cap 25 in place (Fig. 12).

The reaction member 50 and crimping barrel 11a may then be disengaged, the former being slipped off the insulated conductors 18a, 19a and the latter slipped off of the conduit 17a. The sealing is then complete with the skirt 24a properly deformed to retain the cap 25a in place. The entire operation described above may be completed in a matter of only a few minutes.

With reference to Fig. 13, it will be observed that as the inward deformation of the skirt 24a begins, the radial face 34a' abuts the cap 25a and positively shifts the latter into the recess 22a. This assures that the skirt is crimped over the outer face of the cap rather than onto its edges. As the inward deformation of the skirt 24a progresses, the radial face 34a' firmly seats the cap in the recess. It is important to notice also that when the skirt has been turned radially inward an adequate amount, its leading edge abuts the cylindrical surface surrounding the face 34a'. Thus, a very sharp resistance to further axial movement of the crimping member 11a is created. The operator cannot tighten the crimping member 11a on the reaction member 50 to such an extent that the main portion of the body 14a and the cap 25a are crushed by the inclined shoulder 30a.

Figure 14:
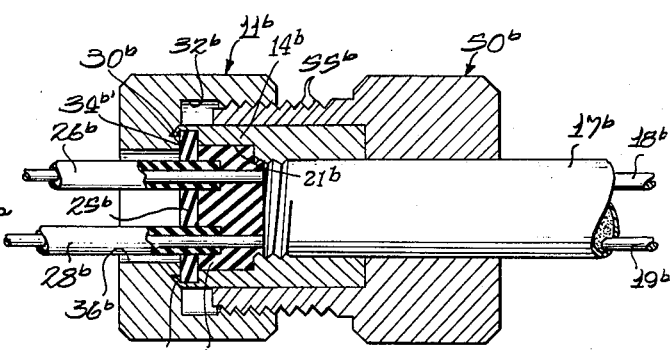
Fig. 14 is similar to Fig. 12, illustrating still another form of the present crimping tool employed with a sealing head in which the well is sealed by a deformable, resilient plug rather than a quantity of paste-like compound.
Figure 15:
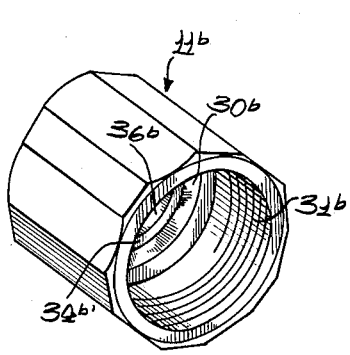
Fig. 15 is a perspective illustration of the crimping member shown in Fig. 14.
Figure 16:
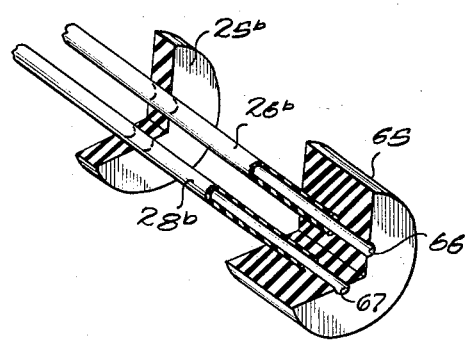
Fig. 16 is a perspective view of the resilient plug, partially broken away for clarity, which is shown in Fig. 14.

Turning next to Figs. 14-16, the crimping tool there shown is generaly like that illustrated in Figs. 7-13. Accordingly the same reference characters with the distinguishing suffix "b" are employed to identify like parts. This embodiment of the tool is particularly well adapted for use on a fitting of the type described and claimed in the joint application of Arthur I. Appleton, Norton A. Appleton, and Nils A. Tornblom, Serial No. 495,244, filed March 18, 1955. In such a fitting, as illustrated in Figs. 14-16, a tight seal is effected between the fitting body or head 14b and the exposed conductors 18b, 19b, by means of a deformable, resilient member 65 disposed in the sealing well 21b and squeezed into a snug fit with the well and conductors when the cap 25b is seated in its recess and the retainer skirt 24b turned inwardly. This eliminates the need for a paste-like sealing compound which is sometimes rather awkward to handle in close quarters.

The resilient member 65 is here embodied as a plug of resilient synthetic rubber, silicone, or other similar material, shaped to be just slightly smaller in diameter but slightly greater in length than the sealing well 21b. The plug 65 is provided with spaced axial holes 66, 67 for receiving the cable conductors 18b, 19b. Preferably the conductor insulating sleeves 26b and 28b are integrally connected with the plug 65, as by bonding in countersunk mouths of the holes 66, 67. There is thus no need for forming bulbous ends on such sleeves as shown in Figs. 11 and 12. Either thermal fusion of the rubber-like plug and sleeves or a separate gluing agent may be used to fix the parts together. In either case, assembly is greatly simplified, since the cap 25b may be slipped over the sleeves 26b, 28b as shown in Fig. 16 and the subassembly handled as a unit.

The reaction member 50b and crimping member 11b are in general constructed and operate in the same manner as the parts 50 and 11a described in connection with Figs. 7-13. However, in this embodiment, the crimping nut 11b is formed with solid walls, i. e. without the vents or ports 60 as shown in Fig. 7, since the use of the resilient plug 65 obviates the problem of excessive sealing compound being squeezed out of the sealing well 21b. The nut 11b (Figs. 14 and 15), therefore, has a continuous outer surface formed with wrench flats and is internally formed with an inclined shoulder 30b and radial face 34b' as previously described above.

The use of the tool in compressing and locking the sealing resilient plug 65 in the well 21b will be apparent from the foregoing description. Briefly, after the head 14b is threaded onto the end of the sheath 17b, the plug is slipped into the well 21b by inserting the exposed conductors 18b, 19b into the holes 66, 67 and through the insulating sleeves 26b, 28b. The cap 25b is then slipped partially into the recess 22b and the nut 11b tightened onto the reaction member 50b. This causes the radial face 34b' to axially seat the cap 25b in the recess 22b, thereby axially compressing the plug 60 and causing it to expand radially into positive sealing engagement with the well 21b. Further tightening of the nut causes the tapered shoulder 30b to crimp the skirt 24b inwardly into locking engagement with the cap 25b. The nut 11b and reaction member 50b may then be removed, leaving the cable terminated with the interior of the sheath 17b effectively sealed against moisture and gases, and with the conductors 18b, 19b ready for electrical connection to any desired apparatus.

I claim:

1. A tool for use in effecting crimping of a sealing skirt on a seamless conduit terminal element around a sealing well cap for such element, said tool comprising a barrel having a stepped longitudinal passageway therethrough, said passageway being divided into large and small diameter portions which are separated by an annular radial face, there being a tapered shoulder radially surrounding a portion of said face with its radially innermost margin spaced axially from said face in a direction toward said small diameter portion and flaring radially outward toward said large diameter portion, and means for positively drawing said barrel axially over the terminal element so that the skirt telescopes into said large diameter portion of the barrel passageway and is deformed radially inward by engagement with said tapered shoulder.

2. A tool for use with a cable terminal element having a sealing well bordered at one axial end by a deformable cap retainer skirt, and including a sealing well cap insertable into the well; said tool comprising a barrel having a central longitudinal passageway therethrough and including a large diameter portion adapted to telescope over said skirt, a smaller diameter portion separated from said large diameter portion by an annular radial face adapted to abut the cap and axially position the latter within the skirt as an incident to such telescoping, a tapered shoulder radially surrounding a portion of said face and flaring axially outward from its innermost marginal edge toward said large diameter portion of the longitudinal passage, and means for positively drawing said barrel axially over the skirt, whereby said face positively positions the cap within the skirt and said shoulder radially crimps the skirt to effect permanent retention of the cap.

3. A tool for use with a fitting having a sealing well surrounded by a cap retainer skirt, said fitting also having a sealing well cap associated therewith, said tool comprising, in combination, a barrel having a longitudinally extending opening therein, an annular wall situated within said barrel intermediate the ends thereof, internal threads between said wall and one end of said barrel, means for receiving a member for applying a torque to said barrel, a resiliently loaded plunger slidably mounted within said body and having a radial face projecting through said annular wall, said plunger being biased toward said one end of said barrel, and a tapered squeezing shoulder on said annular wall, said shoulder flaring outwardly from a point behind said plunger face toward said one end of said barrel.

4. A tool for crimping the sealing well retainer skirt over the sealing well cap on a fitting for mineral insulated sheathed conduit, the fitting having mounting threads thereon, said tool comprising, in combination, a hollow body, an annular wall situated within said body intermediate the ends thereof, internal threads between said wall and one end of said body, said internal threads being adapted to engage the mounting threads of said fitting, a hollow spring loaded plunger adapted to bear resiliently against the sealing well cap, said plunger being slidably mounted within said body and having a radial face on its end projecting through said annular wall, a compression spring interposed between said plunger and the other end of said body, and a tapered squeezing shoulder on said annular wall, said shoulder flaring outwardly from a point behind said plunger face toward said one end of said body.

5. A tool for crimping the sealing well retainer skirt over the sealing well cap on a fitting for mineral insulated sheathed conduit, said fitting having external mounting threads thereon, said tool comprising, in combination, a hollow body, an annular wall located within said body intermediate the ends thereof, a substantially frusto-conical squeezing shoulder situated on said annular wall and increasing in diameter toward one end of said body, internal threads between said wall and said one end of said body, said threads being adapted to engage the mounting threads of said fitting, a hollow spring loaded plunger adapted to bear resiliently against the sealing well cap, said plunger being slidably mounted within said body and having a radial face on one end thereof surrounded by said squeezing shoulder, a stop shoulder on said plunger, and a compression spring interposed between said plunger stop shoulder and the other end of said body, said compression spring being disposed to yieldably maintain said plunger stop shoulder in abutting relation with said annular wall.

6. A portable tool for crimping a deformable skirt or sleeve radially inward to retain a detachable part, said tool comprising, in combination, a hollow barrel, a squeezing shoulder situated within said barrel intermediate the ends thereof, said shoulder flaring outwardly toward one end of said barrel, means for drawing said barrel toward the deformable skirt and thereby bringing said shoulder into squeezing relation with the skirt, and a resiliently loaded plunger slidably mounted within said barrel and projecting toward said one end thereof, said plunger having a radial face on one end surrounded by said shoulder and adapted to bear against the detachable part to hold the same in place during crimping of said deformable skirt.

7. A tool for use with a seamless conduit terminal element having an open-ended sealing well with a marginal, deformable skirt, and a sealing well cap insertable into the well for retention upon inward deformation of the skirt; said tool comprising the combination of a sleeve-like reaction member with a crimping barrel; said reaction member being formed with a radial slot extending the entire length thereof and permitting the reaction member to be slipped over the conduit, an externally threaded portion adapted to telescope over the terminal element, and an internal shoulder adapted to abut the rear end of the element to limit such telescoping; said crimping barrel having means defining a longitudinal passageway therethrough including an internally threaded large diameter portion adapted for threaded engagement with said externally threaded reaction member portion, means defining an annular radial face of lesser diameter than the fitting skirt and adapted to positively position the cap in the skirt as an incident to such threaded engagement, and means defining a tapered shoulder surrounding said face and flaring radially outwardly from a point spaced axially behind said face toward said large diameter portion, whereby said shoulder crimps said skirt radially inward subsequent to the positioning of the cap therein by said radial face as said barrel is threaded onto said reaction member.

8. A tool for use with a conduit sealing head which has an open sealing well bordered by an inwardly deformable skirt and a sealing cap insertable into the well; said tool comprising the combination of a sleeve-like reaction member, with a crimping barrel; said reaction member having an externally threaded portion adapted to telescope over the sealing head, an internal radial shoulder adapted to abut the conduit end of said head and limit such telescoping, and being formed with a lengthwise slot for permitting of insertion and removal of conduit into and from said reaction member; said crimping barrel being formed with an internally threaded portion adapted for threaded engagement with said externally threaded reaction member portion, an internal annular radial face opposite the mouth of said internally threaded portion and having a diameter less than that of the sealing skirt, a tapered shoulder flaring radially outward from a point axially spaced from said face in a direction away from the mouth of the internally threaded portion toward such mouth; and wrench engaging means on the external surfaces of said reaction member and barrel to permit tightening of the same into threaded engagement, whereby said face positions the cap in the well and said tapered shoulder subsequently crimps the skirt inwardly.

9. A tool for use in effecting deformation of a skirt on the end of a conduit sealing head which is securely fixed to one end of a conduit of smaller diameter than that of the head, said tool comprising the combination of a sleeve-like reaction member and a sleeve-like crimping member; one of said members having an externally threaded portion adapted to telescope over said head, an internal shoulder adapted to abut the conduit end of the head upon such telescoping, and said one member being formed with a longitudinal slot permitting such member to be slipped over and removed from conduit; the other of said members having an internally threaded portion adapted for threaded engagement with said externally threaded portion, a radially tapered internal shoulder adapted to abut and deform the fitting skirt when the two members are so threadably engaged, and a radial face disposed radially inwardly from said tapered shoulder and opposite the medial portion of the latter in a lengthwise direction.

10. A tool for use in effecting deformation of a part of a conduit sealing head which is rigidly fixed to one end of a conduit, said tool comprising the combination of a sleeve-like reaction member with a sleeve-like crimping member; said reaction member having an externally threaded portion adapted to telescope over the head and an internal shoulder adapted to abut one end of the head to limit such telescoping, said reaction member further being formed with a lengthwise slot therein for permitting it to be slipped on and off of the conduit; said crimping member having an internally threaded portion adapted for threaded engagement with said externally threaded reaction member portion, a radially tapered internal shoulder adapted to engage and deform the other end of the head as an incident to tightening of said threaded portions, and a radial face disposed radially inwardly from said tapered shoulder and opposite the medial portion of the latter in a lengthwise direction.

11. In a tool for deforming the skirt of a cable terminal element so as to retain a cap in closing relation with a sealing well filled with viscous sealing compound; a crimping barrel having internal threads, a radially tapered internal shoulder, a radial face disposed radially inwardly from said tapered shoulder and opposite the medial portion of the latter in a lengthwise direction, and said barrel having at least one port therein to communicate from the interior to the exterior; and means engageable with said internal threads for drawing said barrel over the terminal element to thereby cause said shoulder to deform said skirt, excess sealing compound in the sealing well escaping freely from said barrel through said port.

References Cited in the file of this patent

UNITED STATES PATENTS

| | | |
|---|---|---|
| 1,224,875 | Zarth | May 1, 1917 |
| 1,773,410 | Selah | Aug. 19, 1930 |
| 2,015,541 | Weatherhead | Sept. 24, 1935 |
| 2,355,871 | Kraft | Aug. 15, 1944 |
| 2,604,258 | Murnane et al. | July 22, 1952 |